United States Patent
Gatnau Navarro et al.

(10) Patent No.: US 9,939,590 B2
(45) Date of Patent: Apr. 10, 2018

(54) SELF-CLEANING FIBER OPTIC CONNECTION SYSTEM

(71) Applicant: CommScope Connectivity Spain, S.L, Montcada i Reixac, Barcelona (ES)

(72) Inventors: Jorge Gatnau Navarro, Barcelona (ES); Maria Maqueda Gonzalez, Barcelona (ES); Montserrat Blanch Morella, Barcelona (ES); Rafael Mateo Ferrus, Barcelona (ES); Jaime Pelai Torija, Barcelona (ES)

(73) Assignee: CommScope Connectivity Spain, S.L. (ES)

( * ) Notice: Subject to any disclaimer, the term of this patent is extended or adjusted under 35 U.S.C. 154(b) by 0 days.

(21) Appl. No.: 15/031,405

(22) PCT Filed: Oct. 22, 2014

(86) PCT No.: PCT/ES2014/070797
§ 371 (c)(1),
(2) Date: Apr. 22, 2016

(87) PCT Pub. No.: WO2015/059334
PCT Pub. Date: Apr. 30, 2015

(65) Prior Publication Data
US 2016/0306123 A1    Oct. 20, 2016

Related U.S. Application Data

(60) Provisional application No. 61/894,204, filed on Oct. 22, 2013.

(51) Int. Cl.
*G02B 6/38*    (2006.01)
(52) U.S. Cl.
CPC ......... *G02B 6/3866* (2013.01); *G02B 6/3825* (2013.01); *G02B 6/3847* (2013.01);
(Continued)

(58) Field of Classification Search
CPC ................. G02B 6/38; G02B 6/3866
(Continued)

(56) References Cited

U.S. PATENT DOCUMENTS

5,838,860 A * 11/1998 Kingstone ............... F21V 29/74
                                                         385/100
6,186,670 B1 * 2/2001 Austin ................. G02B 6/3825
                                                         385/55
(Continued)

FOREIGN PATENT DOCUMENTS

JP     H07 218768     8/1995
JP     2006-276781    10/2006

OTHER PUBLICATIONS

International Search Report and Written Opinion for International Application No. PCT/ES2014/070797 dated Jan. 15, 2015 (10 pages).

*Primary Examiner* — Kaveh C Kianni
(74) *Attorney, Agent, or Firm* — Merchant & Gould P.C.

(57) ABSTRACT

A self-cleaning optical fiber connector system for ensuring dust or contaminants are cleared from an optical connection interface is disclosed. In one aspect, the optical fiber connector system includes a connector joining first and second connectors. The adapter has a main body defining a central opening within which the connectors are received. The connectors each include a fiber optic cable secured by a ferrule. In one aspect, the ferrule defines an airflow passageway that narrows between a second opening and a first opening proximate an end face of the cable optical core and cladding. The connectors are constructed such that, as each connector is being inserted into the connector, an air flow is generated through the ferrule airflow passageway, and optionally through an exhaust airflow passageway in the connector. The generated airflow clears debris from the (Continued)

exposed end faces. Electrostatic precipitation may also be used to aid in clearing dust and debris, alone or in combination with air flow effects.

11 Claims, 4 Drawing Sheets

(52) U.S. Cl.
 CPC ......... *G02B 6/3867* (2013.01); *G02B 6/3874* (2013.01); *G02B 6/3845* (2013.01)
(58) Field of Classification Search
 USPC .......................................................... 385/60
 See application file for complete search history.

(56) References Cited

U.S. PATENT DOCUMENTS

| | | | | |
|---|---|---|---|---|
| 6,854,152 B2* | 2/2005 | Loder | ....................... | B08B 1/00 15/104.94 |
| 8,118,494 B2* | 2/2012 | Larson | ................. | G02B 6/3846 385/60 |
| 9,205,610 B1* | 12/2015 | Danley | ............ | B29D 11/00663 |
| 2002/0102065 A1* | 8/2002 | Kiani | ....................... | B08B 3/02 385/75 |
| 2004/0005134 A1* | 1/2004 | Sun | ........................... | B08B 3/12 385/134 |
| 2004/0013370 A1* | 1/2004 | Gerhard | ..................... | B08B 3/02 385/85 |
| 2004/0033050 A1* | 2/2004 | Lytle | ....................... | B08B 3/02 385/147 |
| 2008/0011990 A1* | 1/2008 | Kostet | .................. | G02B 6/4457 254/134 |
| 2008/0013957 A1* | 1/2008 | Akers | ................ | H04B 10/2504 398/115 |
| 2008/0131327 A1* | 6/2008 | Van Dam | .......... | B01L 3/502715 422/400 |
| 2009/0310923 A1* | 12/2009 | Hovland | .............. | G02B 6/3849 385/94 |
| 2012/0082417 A1* | 4/2012 | Stanley | ................ | G02B 6/3866 385/77 |
| 2012/0321257 A1* | 12/2012 | Lu | ........................ | G02B 6/3861 385/84 |
| 2013/0316299 A1* | 11/2013 | Berkely | ............. | A61C 17/0202 433/80 |
| 2015/0309279 A1* | 10/2015 | Isenhour | ............... | G02B 6/3897 385/135 |
| 2016/0216456 A1* | 7/2016 | Leigh | ................... | G02B 6/4296 |
| 2016/0349460 A1* | 12/2016 | Collier | ................. | G02B 6/3849 |

* cited by examiner

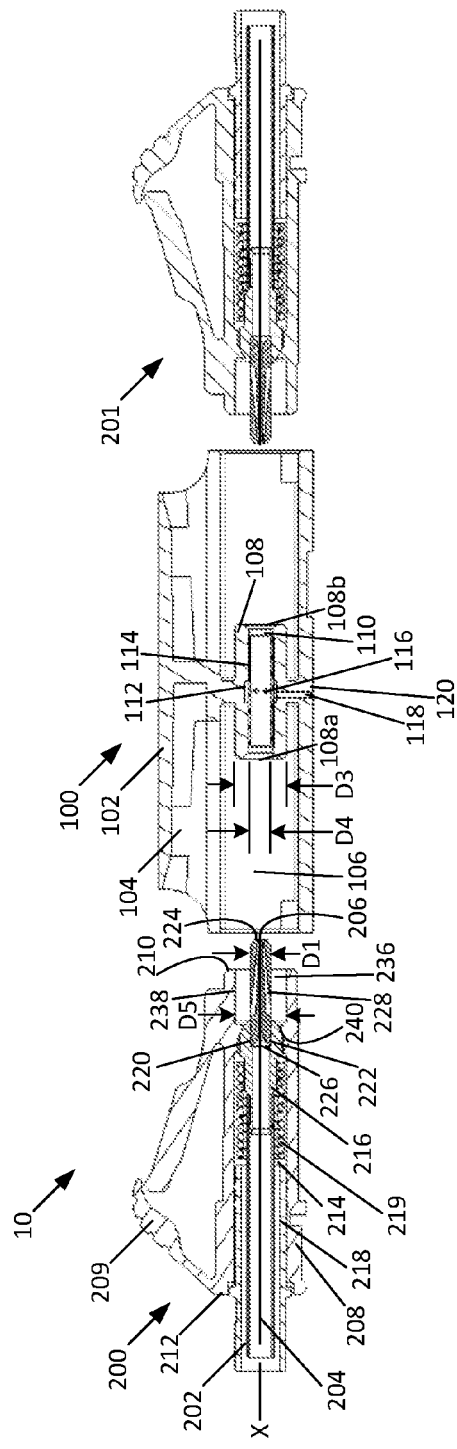
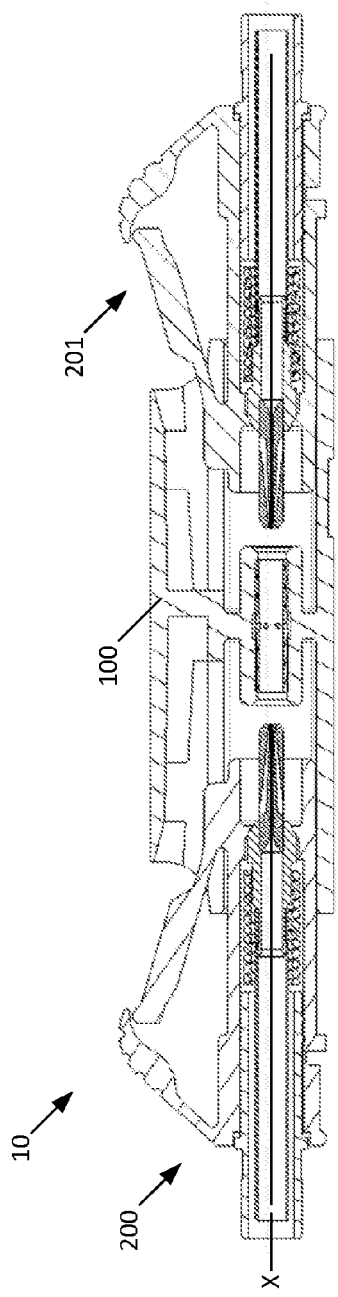
FIG. 1
FIG. 2

SELF-CLEANING FIBER OPTIC CONNECTION SYSTEM

RELATED APPLICATIONS

This application is a National Stage of PCT/ES2014/070797, filed 22 Oct. 2014, which claims benefit of U.S. Patent Application Ser. No. 61/894,204 filed on Oct. 22, 2013, which applications are incorporated herein by reference in their entirety. To the extent appropriate, a claim of priority is made to each of the above disclosed applications.

TECHNICAL FIELD

The present invention relates to an optical fiber connection system, including components for connecting fiber optic cables together.

BACKGROUND

Optical fiber distribution systems include fiber terminations which can be connected to other fiber terminations or devices. Various concerns exist for the optical fiber distribution connections, particularly with respect to contamination of the exposed ends of the fiber terminations. Such contamination can significantly disrupt and interfere with the transmission of optical signals. For example, any contamination in the fiber connection can cause failure of the component or failure of the whole system. Even microscopic dust particles can cause a variety of problems for optical connections. A particle that partially or completely blocks a fiber exposed end generates strong back reflections, which can cause instability in the laser system. Dust particles trapped between two fiber exposed ends or faces can scratch the glass surfaces. Even if a particle is only situated on the cladding or the edge of the end face, it can cause an air gap or misalignment between the fibers which significantly degrades the optical signal. Accordingly, there is a continuing need for improvements to optical fiber connection systems.

SUMMARY

A self-cleaning optical fiber connector system is disclosed. In one aspect, the optical fiber connector system includes a connector and a first connector. The connector has a main body defining a central opening and can also be configured with a receptacle body disposed within the main body. In one embodiment, a sleeve member is disposed within the receptacle body. In one aspect, the first connector includes a fiber optic cable having a first end face. In one aspect, the first connector includes a connector main body adapted to be removably received in the adapter main body central opening. A ferrule may also be provided that has a main body secured to the cable and that is at least partially disposed within the connector main body. In one aspect the ferrule defines an airflow passageway that narrows between a second opening and a first opening wherein the first opening is proximate the first end face of the fiber optic cable.

In one aspect, the adapter and first connector are constructed such that, as the first connector is being inserted into the adapter main body, an air flow is generated from the connector main body recess and through the ferrule airflow passageway. The air flow may also be directed through the exhaust airflow passageway and to the exterior environment.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 1 is a cross-sectional side view of a fiber optic connection system having features that are examples of aspects in accordance with the principles of the present disclosure, wherein first and second connectors associated with the system are removed from an adapter.

FIG. 2 is a cross-sectional side view of the connection system shown in FIG. 1, wherein the first and second connectors are partially inserted into the adapter.

DETAILED DESCRIPTION

Figure 3:
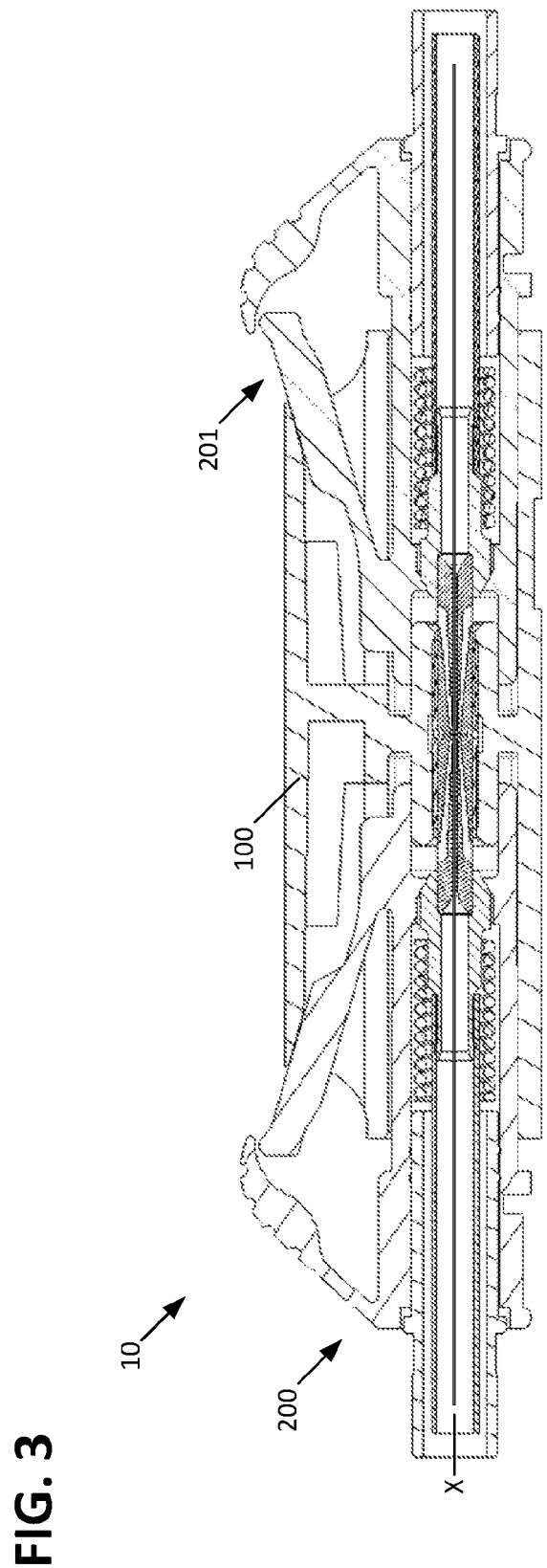
FIG. 3 is a cross-sectional side view of the connection system shown in FIG. 1, wherein the first and second connectors are fully inserted into the adapter.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A self-cleaning fiber optic connection system 10 for connecting fiber optic cables is disclosed. As discussed in detail herein, the self-cleaning fiber optic connection system 10 relies upon a self-generated air flow to clean ensure the optical connection from dust and debris that can negatively affect optical performance. Optionally, the connection system 10 can utilize electrostatic precipitation to collect dust and debris within the adapter 100. In one embodiment, the connection system 10 includes an adapter 100 configured to receive at least one fiber optic connector 200. In the particular embodiment shown, an LC type adapter 100 is configured to receive two identical LC type fiber optic connectors 200, 201, and to place fiber optic cables 202 associated with the connectors 200, 201 in optical communication with each other. As the exemplary embodiment disclosed herein utilizes identical first and second connectors 200, 201, the corresponding constituent components of the connectors 200, 201 will be identified with the same reference numbers. However, it is to be understood that the self-cleaning fiber optic connection system 10 may be with a wide variety of plug, connector, and adapter arrangements and configurations.

As shown, the fiber optic cable 202 has a fiber optic core and cladding 204. At one end of the cable 202, the fiber optic core and cladding 204 has an exposed end face 206 for interfacing and providing an optical connection with another optical device, for example the exposed end face 206 of another fiber optic cable associated with connector 201. The fiber optic cable 202 may also be configured with a number of other concentrically arranged layers, such as a buffer layer and an outer jacket. Many other types of cable configurations are possible and usable with the concepts disclosed herein.

As configured, the connector 200, 201 has a main body 208 having a first end 210 and an opposite second end 212. A central cavity 214 is provided within the housing connector main body 208 extending between the first and second ends 210, 212. The central cavity 214 is configured to receive the fiber optic cable 202 which is secured to a ferrule 220 by a ferrule base 216. The ferrule base 216 is secured within the central cavity 214 by a locking body 218 and is biased towards the connector main body first end 210 by a biasing spring 219. This construction allows for a biasing force to be applied on the exposed end face 206 to provide a positive engagement with another fiber optic core and cladding end face (e.g. end face 206 of second connector 201). The connector 200, 201 is also provided with a latch mechanism 209 for removably securing the connector main body 208 to a corresponding catch 104 in the main body 102 of the adapter 100.

As shown, the ferrule 220 has a generally cylindrical main body 222 that has a first diameter D1 and that extends between a first end face 224 and a second end 226. In one aspect, the main body 222 has an outer surface 228 and a central axial passageway 230 extending along a longitudinal axis X. As more easily seen at FIG. 4, the fiber optic core and cladding 204 is disposed within the central axial passageway 230 such that the exposed end face 206 is in generally the same plane as the ferrule main body first end face 224.

Figure 4:
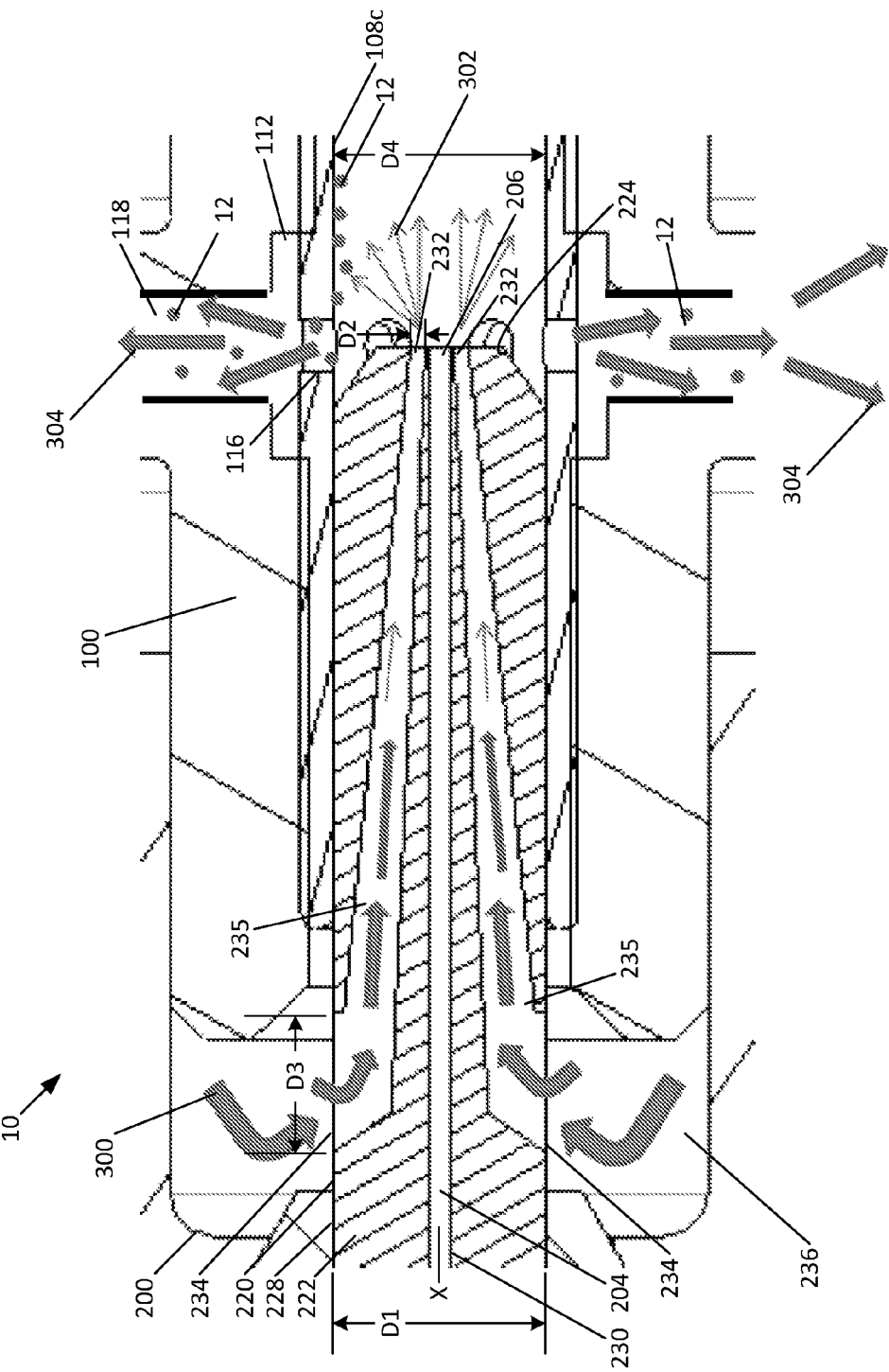
FIG. 4 is a cross-sectional side view of a portion of the connection system shown in FIG. 1, showing an airflow pattern through the first connector and the adapter during insertion.

Still referring to FIG. 4, the ferrule 220 also includes a plurality of radially spaced air flow passageways 235. The air flow passageways 235 are for directing air towards and around the exposed end face 206 during installation so that any contaminants present in the adapter 100 or on the connector 200, 201 are prevented from remaining or depositing on the exposed end face 206 during insertion into the fiber optic adapter 100. As presented, each of the passageways 235 extends from a first opening 232 in the ferrule main body 222 to a second opening 234. The first opening 232 is provided at the first end face 224 of the main body 222 and adjacent the exposed end face 206. The second opening 234 is located in the ferrule main body outer surface 228 and is disposed between the main body first and second end faces 224, 226. Accordingly, the passageways 235 extend in a generally axial direction from the first end face 224 towards the second end 226 of the main body 222.

In a preferred embodiment, the first opening 232 has a second opening diameter or dimension D2 that is less than a corresponding second opening diameter or dimension D3 of the second opening 234. Accordingly, the resulting opening area of the first opening 232 is less than the resulting opening area of the second opening 234. In such a construction, the passageway 235 can have a narrowing cross-sectional area as the passageway 235 extends from the second opening 234 towards the first opening 232.

As shown, each connector 200, 201 main body 208 is also provided with a recess 236 defined by a recess sidewall 238 and a recess end wall 240 through which the ferrule 220 projects. As shown, the recess sidewall 238 has a dimension D5.

As previously discussed, each connector 200, 201 is configured to be removably connected to the adapter 100. As most easily seen at FIG. 1, the adapter 100 includes a main body 102 having a central opening 106 within which a portion of the connector 200 can be received. Within the central opening 106, an internal receptacle body 108 is disposed which extends between a first end 108a and a second end 108b, and defines an interior opening 110. As presented, the receptacle body 108 is configured to receive the ferrule 220 of the first connector 200 at the first end 108a and to receive the ferrule 220 of the second connector 201 at the second end 108b. In one embodiment, the first end face 224 of the ferrule 220 and the first and second ends 108a of the receptacle body 108 are each provided with a circumferential taper or chamfer to enable easier insertion of the ferrule 220 into the receptacle body 108.

The internal receptacle body 108 is also shown as being provided with an annular recess 112 between the first and second ends 108a, 108b. Within the interior opening 110 of the receptacle body 108, a sleeve member 114 is provided including a plurality of radially spaced apertures 116 that are aligned with the annular recess 112. The annular recess 112 may also be provided with one or more exhaust ports 118 extending to the outer surface 120 of the connector main body 208 to form a passageway with the apertures 116 that places the interior of the sleeve member 114 in fluid communication with the atmosphere or external environment. In one embodiment, the sleeve member 114 is configured as a collection surface electrode via electrostatic precipitation. In such a case, any dust particles or other contaminants 12 residing within the sleeve member 114 will be drawn out of an ionizing airflow passing through the sleeve member 114 and towards the interior wall 108c of the sleeve member 114.

The friction between the sleeve member 114 and the ferrule 220 during insertion generates a differential electrical charge on both components which causes the contaminants 12 to become ionized. Also, particle (dust) ionization is generated by electromechanical interaction during connector insertion between materials used in the ferrule 220, for example ceramics and crystalline materials, and the materials used in the sleeve member 114, for example metal substrates. In response to applied mechanical interaction (squeeze, stress, friction, twisting or impact), the dust particles are charged and collected in the required surface (electrode). Direct air ionizing and mechanical interaction (between different materials) can be used alone or together to obtain the desired electrostatic precipitation effect.

As shown, the receptacle body 108 has an outer dimension D3 while the sleeve member 114 has an interior dimension D4. As configured, dimension D3 of the receptacle main body 108 is slightly smaller than dimension D5 of the connector main body recess 236 such that the receptacle main body 108 can be slidingly received by the connector main body 208, but also such that air cannot easily escape between the recess sidewall 238 and the receptacle main body 108. Similarly, the interior dimension D4 of the sleeve member 114 is slightly larger than dimension D1 of the ferrule 220 such that the ferrule 220 can be slidingly received by the sleeve member 114 and such that air cannot easily escape between the ferrule outer surface 228 and the sleeve member 114.

Figure 5:
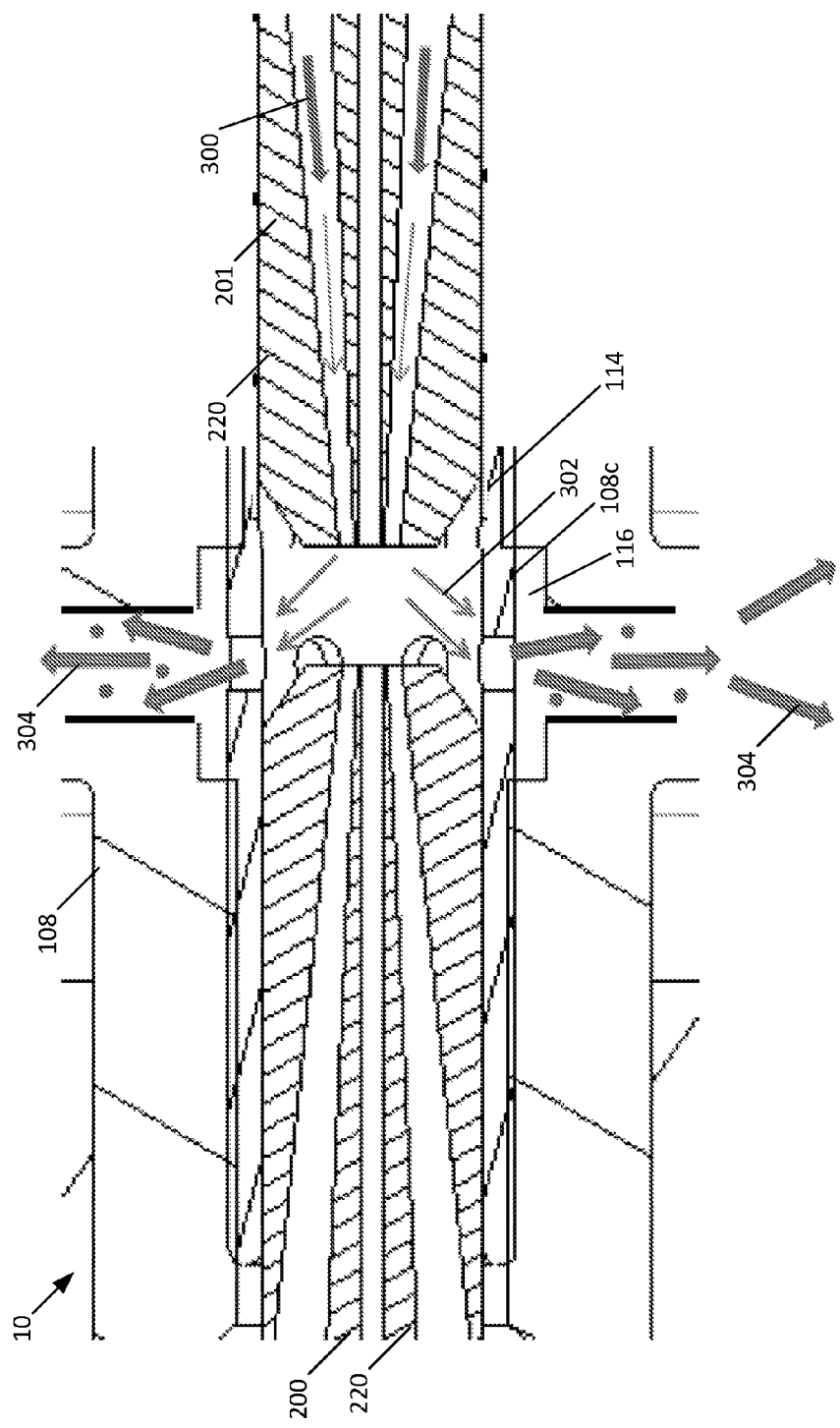
FIG. 5 is a cross-sectional side view of a portion of the connection system shown in FIG. 1, showing an airflow pattern through the second connector and the adapter during insertion.

With reference to FIGS. 4 and 5, the insertion process will now be explained. As shown in FIG. 4, the first connector 200 is inserted into the adapter main body 102. As the ferrule first end face 224 extends beyond the first end 210 of the connector main body 208, the ferrule 220 will be received into the interior opening 110 of the receptacle member 108 before the receptacle member 108 is received by the connector main body sidewall 238 that defines the recess 236. Once the first connector 200 is inserted to an extent that the sidewall 238 and the receptacle member 108 overlap, the recess 236 is closed off by the first end 108a of the receptacle member 108 such that air trapped within the recess 236 can generally only escape through the second opening 234 of the ferrule 220. Accordingly, as the first connector 200 is further inserted beyond this point, an airflow 300 is generated from the recess 236, into the ferrule second openings 234, through the ferrule passageway 235, and out of the ferrule first openings 232, as most easily seen at FIG. 4.

As the ferrule first openings 232 have a smaller net area than the area defined by the dimension D3 of the receptacle body 108, and the area defined by second openings 234, the airflow 300 is rapidly discharged as a discharge air flow 302 out of the first openings 232, as compared to the speed of the insertion rate of the connector 200. It is noted that the narrowing of the passageways 235 causes air flow acceleration. Accordingly, the accelerated discharge airflow 302 operates to protect the fiber exposed end face 206 from being contacted by dust particles or other contaminants 12 by acting as a protective barrier and by blowing the contaminants or dust particles away from the exposed end face 206. Where the sleeve member 114 is constructed as an electrode collection surface, the sleeve member 114 can operate to collect the dust particles or other contaminants 12 that are moved by the discharge airflow 302. Additionally, the dust particles 12, along with the discharge airflow 302, can be carried to the exterior of the adapter 100 via apertures 116 and exhaust ports 118 to result in an exhaust airflow 304.

Referring to FIG. 5, the second connector 201 is being inserted into the adapter main body 102 after insertion of the first connector 200. It is to be understood that the above described airflow generation for the first connector 200 is entirely applicable to the second connector 201, and those aspects will not be repeated here. Instead, the airflow dynamics occurring when a second connector is installed after a first connector has been installed will be discussed. As the ferrule 220 of the first connector 200 has filled the interior of the sleeve member 114 at the receptacle body first end 108a, the discharge airflow 302 generated by the second connector 201 is entirely directed to the outer surface 120 of the adapter main body 102 via the apertures 116 in the sleeve member 114 and the exhaust ports 118. Accordingly, any remaining dust particles or other contaminants 12 are either removed from the interior wall 108c of the sleeve member by the ferrule member sliding against the interior wall 108c and/or by the force of the discharge airflow 302. Once the second connector 201 is fully inserted, the exposed end face 206 of the second connector 201 is brought into contact with the exposed end face 206 of the first connector 200 with greater assurance that no dust particles or contaminants 12 are trapped between the exposed end faces 206 which would reduce signal quality. Although utilizing electrostatic precipitation in conjunction with producing a discharge airflow within the sleeve member 114 can be advantageous, it is noted that the use of a discharge airflow without electrostatic precipitation is also beneficial.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. An optical fiber connector system comprising:
 a. an adapter having a main body defining a central opening; and
 b. a first connector including:
  i. a fiber optic cable having a core and a cladding, the fiber optic cable having a first exposed end face;
  ii. a connector main body adapted to be removably received in the adapter main body central opening;
  iii. a ferrule having a main body secured to the fiber optic cable and being at least partially disposed within the connector main body, the ferrule defining an airflow passageway;
 c. the adapter and first connector being constructed such that, as the first connector is being inserted into the adapter main body, an air flow is generated from a recess within the connector main body and through the ferrule airflow passageway;
 d. wherein the airflow passageway extends from a first opening proximate the first exposed end face to a second opening in the ferrule main body and wherein the airflow passageway tapers in a continuous direction from the second opening to the first opening.

2. The optical fiber connector system of claim 1, wherein the adapter main body includes a receptacle body having a central opening, the receptacle body and adapter main body defining an exhaust air passageway extending from the central opening to an outer surface of the connector main body.

3. The optical fiber connector system of claim 2, wherein the adapter and the first connector are constructed such that, as the first connector is being inserted into the adapter main body, an air flow is generated from the connector main body recess, through the ferrule airflow passageway, and through the exhaust air passageway.

4. The optical fiber connector system of claim 2, wherein the ferrule is constructed to be received into the receptacle body central opening.

5. The optical fiber connector system of claim 2, wherein the receptacle body further includes a sleeve member disposed within the central opening.

6. The optical fiber connector system of claim 5, wherein the sleeve member includes one or more apertures forming a portion of the exhaust air passageway.

7. The optical fiber connector system of claim 1, wherein the ferrule airflow passageway includes a plurality of airflow passageways.

8. The optical fiber connector system of claim 7, wherein each of the plurality of airflow passageways extends from a first opening proximate the first exposed end face to a second opening in the ferrule main body.

9. The optical fiber connector system of claim 8, wherein the first opening is smaller than the second opening.

10. An optical fiber connector system comprising:
 a) an adapter having a main body defining a central opening; and
 b) a first connector including:
  i) a fiber optic cable having a core and a cladding, the fiber optic cable having a first exposed end face;
  ii) a connector main body adapted to be removably received in the adapter main body central opening;
  iii) a ferrule having a main body secured to the fiber optic cable and being at least partially disposed within the connector main body, the ferrule defining an airflow passageway;
 c) the adapter and first connector being constructed such that, as the first connector is being inserted into the adapter main body, an air flow is generated from a recess within the connector main body and through the ferrule airflow passageway;
 d) wherein the adapter main body includes a receptacle body having a central opening, the receptacle body and adapter main body defining an exhaust air passageway extending from the central opening to an outer surface of the connector main body;

e) wherein the ferrule is constructed to be received into the receptacle body central opening;

f) wherein the connector main body defines the recess at a first end through which the ferrule extends and wherein the receptacle body is received at least partially into the connector main body recess.

11. An optical fiber connector system comprising:

a) an adapter having a main body defining a central opening; and b) a first connector including:

i) a fiber optic cable having a core and a cladding, the fiber optic cable having a first exposed end face;

ii) a connector main body adapted to be removably received in the adapter main body central opening;

iii) a ferrule having a main body secured to the fiber optic cable and being at least partially disposed within the connector main body, the ferrule defining an airflow passageway;

c) the adapter and first connector being constructed such that, as the first connector is being inserted into the adapter main body, an air flow is generated from a recess within the connector main body and through the ferrule airflow passageway;

e) wherein the adapter main body includes a receptacle body having a central opening, the receptacle body and adapter main body defining an exhaust air passageway extending from the central opening to an outer surface of the connector main body;

f) wherein the receptacle body further includes a sleeve member disposed within the central opening;

g) wherein the sleeve member is configured as a collection surface electrode.

* * * * *